(12) United States Patent
Moriya

(10) Patent No.: US 11,829,659 B2
(45) Date of Patent: Nov. 28, 2023

(54) SYSTEM AND CONTROL METHOD TO OBTAIN A PRINTING FILE AND DECIDE A TYPE OF AN ACCOUNT OF A USER

(71) Applicant: CANON KABUSHIKI KAISHA, Tokyo (JP)

(72) Inventor: Takashi Moriya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/324,417

(22) Filed: May 19, 2021

(65) Prior Publication Data

US 2021/0373821 A1 Dec. 2, 2021

(30) Foreign Application Priority Data

May 27, 2020 (JP) .................................. 2020-092545

(51) Int. Cl.
*G06F 3/12* (2006.01)
*G06F 3/0482* (2013.01)

(52) U.S. Cl.
CPC .......... *G06F 3/1222* (2013.01); *G06F 3/1204* (2013.01); *G06F 3/1206* (2013.01); *G06F 3/1239* (2013.01); *G06F 3/1255* (2013.01); *G06F 3/0482* (2013.01); *G06F 3/1273* (2013.01); *G06F 3/1287* (2013.01)

(58) Field of Classification Search
None
See application file for complete search history.

(56) References Cited

U.S. PATENT DOCUMENTS

| | | | | |
|---|---|---|---|---|
| 10,142,498 | B2* | 11/2018 | Maemura | G06F 3/1238 |
| 2006/0001897 | A1* | 1/2006 | Ogasawara | H04N 1/444 |
| | | | | 358/1.13 |
| 2012/0262742 | A1* | 10/2012 | Yano | G03G 15/502 |
| | | | | 358/1.9 |
| 2012/0268769 | A1* | 10/2012 | Kashioka | H04L 41/0803 |
| | | | | 358/1.14 |
| 2014/0293344 | A1* | 10/2014 | Umezawa | G06F 3/1258 |
| | | | | 358/1.15 |
| 2015/0054784 | A1* | 2/2015 | Kim | G06F 3/0446 |
| | | | | 345/174 |
| 2015/0118672 | A1 | 4/2015 | Yeskel | |
| 2017/0090832 | A1* | 3/2017 | Ishibashi | G06F 3/1238 |
| 2018/0107438 | A1* | 4/2018 | Takeuchi | H04L 63/20 |
| 2021/0165616 | A1* | 6/2021 | Yasuda | G06F 3/1222 |
| 2023/0062188 | A1* | 3/2023 | Saito | G06F 3/126 |

OTHER PUBLICATIONS

Google Classroom [online] [search Apr. 17, 2020], Internet URL: http://edu.google.com/intl/products/classroom/.
Google Drive [online] [search Apr. 17, 2020], Internet URL: https://www.google.com/drive/) [partial translation].

* cited by examiner

*Primary Examiner* — Haris Sabah
(74) *Attorney, Agent, or Firm* — VENABLE LLP

(57) ABSTRACT

A system for obtaining a file on a network and printing the file, comprises: a determination unit configured to determine a type of an account of a user; a decision unit configured to decide a printing target file from a plurality of files on the network in accordance with a condition corresponding to the type determined by the determination unit; and a printing unit configured to obtain the printing target file decided by the decision unit from the network and print the printing target file.

19 Claims, 9 Drawing Sheets

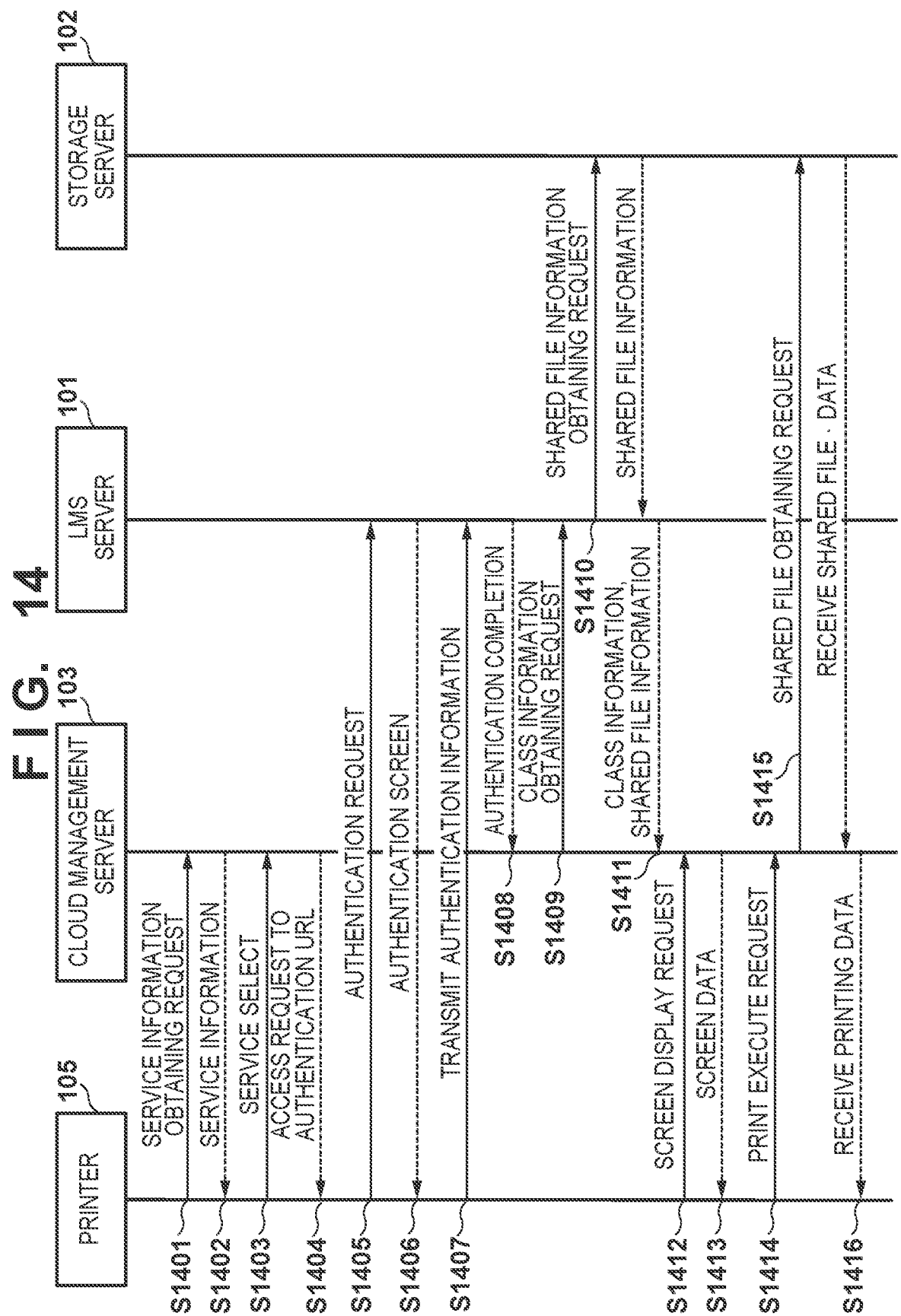

SYSTEM AND CONTROL METHOD TO OBTAIN A PRINTING FILE AND DECIDE A TYPE OF AN ACCOUNT OF A USER

BACKGROUND OF THE INVENTION

Field of the Invention

The present invention relates to a system for obtaining a file from a network and printing it, and a control method.

Description of the Related Art

In an educational field, an LMS (Learning Management System) is known a learning support system which can be used on a web. In general, students create submissions for homework prepared by school teachers on line, and the teachers score the submissions in many cases (Google Classroom© [online] [search Apr. 17, 2020], Internet URL: http://edu.google.com/intl/products/classroom/). In the LMS, in association with another web storage service, a shared file can be created on the Internet to perform file exchange of homework and submissions via the network (Google Drive© [online] [search Apr. 17, 2020], Internet URL: https://www.google.com/drive/).

In a school class environment, a teacher (a privileged user) can create homework as the shared file of a class. A student (a general user) shares or copies a file from the teacher of the class to which the student belongs to his/her own network storage. There is known an LMS control method of creating a homework file when the teacher prepares the homework and copying the homework file so that the student can refer to the homework file. (US-2015-0118672). In this manner, it is desirable that the authorization setting for the shared file saved in the storage service on the Internet can be changed in accordance with the types of users as the teacher and the student. By adding an access authorization setting in accordance with the type of the user to the homework, the security can be ensured so a user unintended by the teacher cannot freely access the homework.

SUMMARY OF THE INVENTION

The present invention provides a system for printing a desired file group with an easier operation, and a control method.

The present invention in one aspect provides a system for obtaining a file on a network and printing the file, comprising: a determination unit configured to determine a type of an account of a user; a decision unit configured to decide a printing target file from a plurality of files on the network in accordance with a condition corresponding to the type determined by the determination unit; and a printing unit configured to obtain the printing target file decided by the decision unit from the network and print the printing target file.

According to the present invention, the desired file group can be printed with an easier operation.

Further features of the present invention will become apparent from the following description of exemplary embodiments with reference to the attached drawings.

BRIEF DESCRIPTION OF THE DRAWINGS

FIG. 14 is a sequence chart showing a communication sequence between a plurality of servers.

DESCRIPTION OF THE EMBODIMENTS

Figure 1:
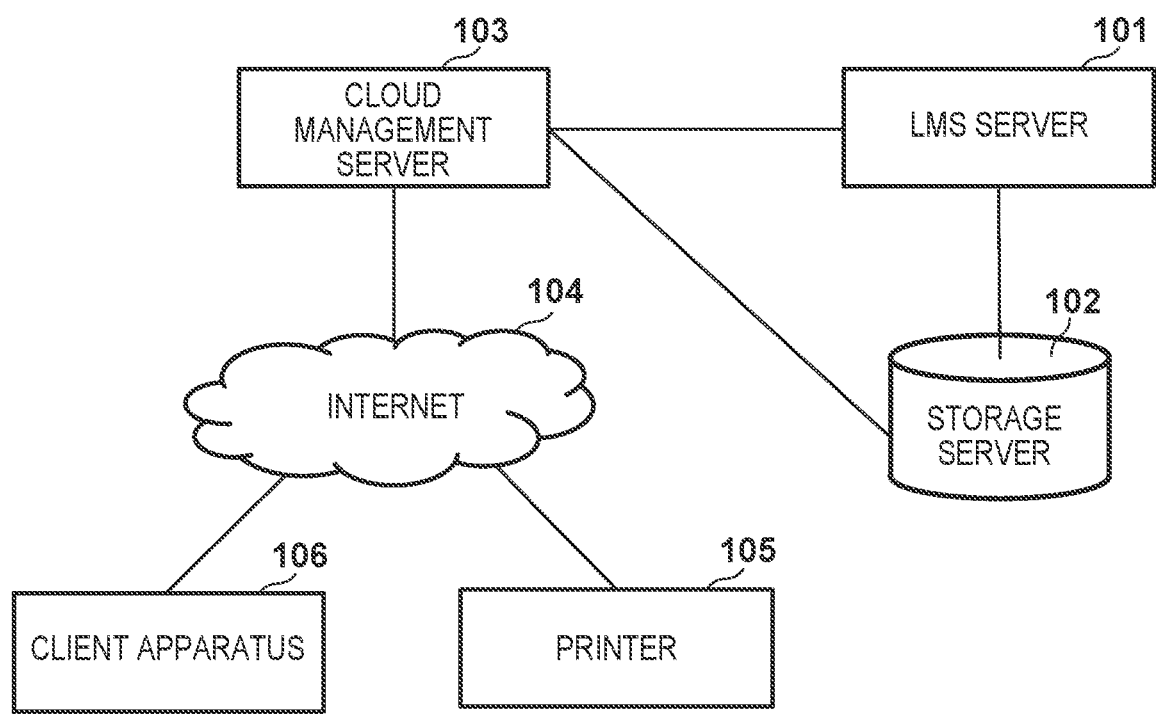
FIG. 1 is a block diagram showing the arrangement of a printing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In a system for obtaining homework prepared in an LMS and submissions from students and printing them, a shared file group serving as a collective printing target changes depending on the account type of a user (for example, a teacher or a student). Even in this case, a technique for printing a desired file group with an easier operation is desired.

FIG. 1 is a block diagram showing an example of a system arrangement for performing printing from an LMS (Learning Management System) via a network. A user who uses the printing system shown in FIG. 1 obtains a file on the network from a printer 105 installed at home or in a school room via the Internet 104 and prints the file. The LMS service as a form of a web service can be used from the Internet 104.

The LMS service is a program executed by an LMS server 101. The LMS server 101 is a core server which implements an e-learning system. The LMS server 101 comprehensively controls teaching materials including the shared file, and constituent information of each class. The LMS server 101 includes a user account management service and a user authentication service to register and use necessary users. The registered user information is stored in the LMS server 101. The LMS service implements a function by cooperating with the storage service for storing the shared file created in a class. The shared file is a file which can be shared between the teacher and the students and includes "homework" prepared by the teacher for the student.

The storage service is a program executed by a storage server 102. Information concerning the homework file as the class achievement and submission generated by the LMS server 101 upon a user operation is registered in the storage server 102. The file itself generated by the teacher, edited by the student, and stored in the network storage serves as a printing target file. A printable file format is, for example, a document file (for example, Word© or PDF), a slide file (for example, PowerPoint©) an image file, or a text file, but is not limited to such a file format.

Note that the LMS service collectively manages user authentication of the LMS service and the storage service. Alternatively, the services may be individually managed. If sufficient user authentication and permission for the service function concerning each LMS and shared file used by the user can be executed via the screen operation of the printer 105 or the device of a client apparatus 106, the security management form of each service is not particularly limited.

A cloud management server 103 provides an LMS printing service as a cloud management service to the LMS server 101 and the storage server 102 via the communication with the printer 105 and the client apparatus 106. The LMS printing service is a program executed by the cloud management server 103. The cloud management server 103 allows the printer 105 to communicate with the external service via the cloud management server 103 and the Internet 104 without directly communicating with the LMS server 101 and the storage server 102.

The printer 105 and the client apparatus 106 are connected to the Internet 104 by, for example, an access point. A web browser is installed in each of the printer 105 and the client apparatus 106. When a web service is displayed on a browser screen installed in the cloud management server 103, the LMS printing service can be provided to the user. The client apparatus 106 is, for example, a PC or portable terminal, and constitutes a general information processing apparatus represented by the PC or portable terminal.

Figure 2:
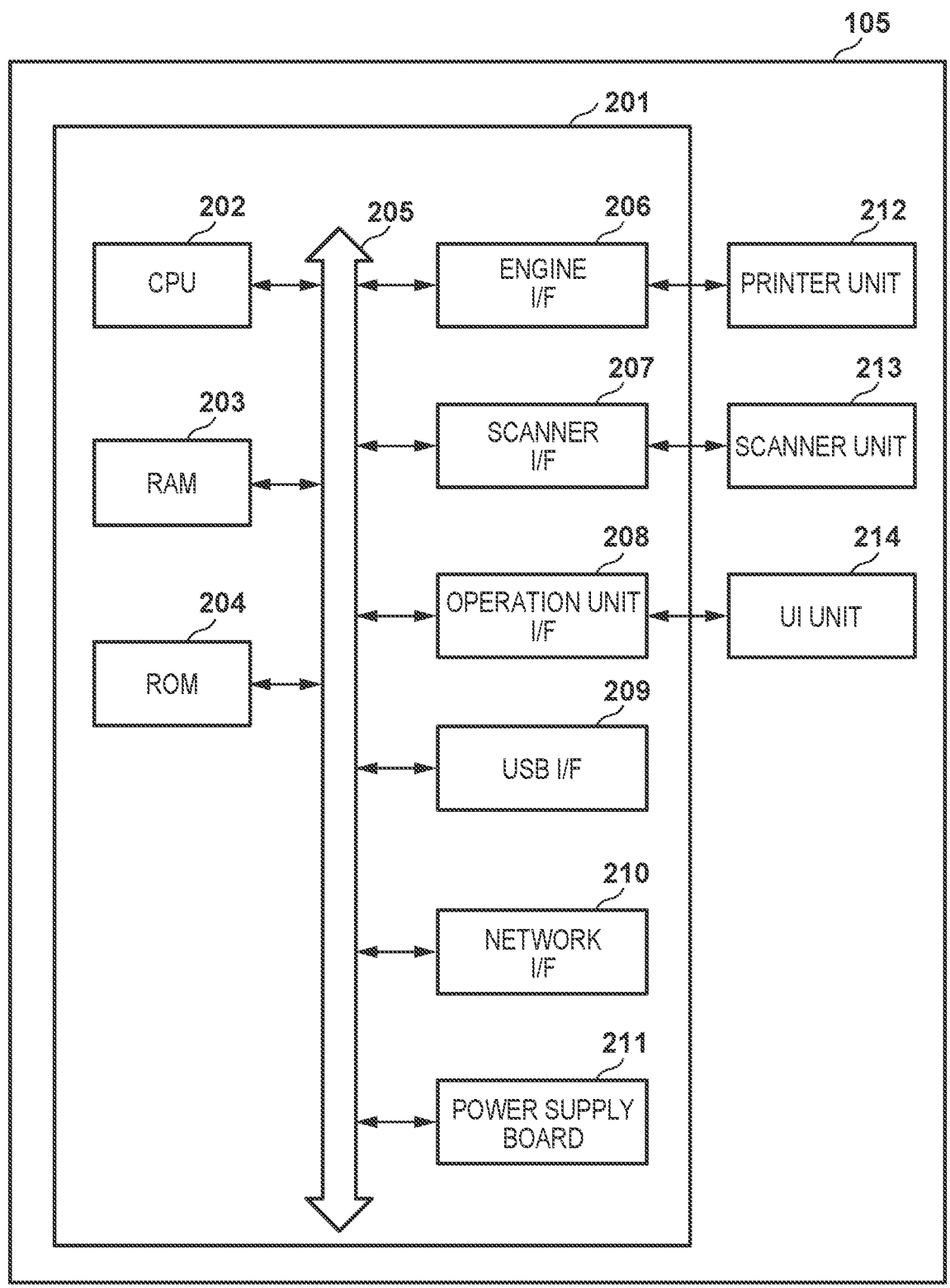
FIG. 2 is a block diagram showing the arrangement of a printer.

FIG. 2 is a block diagram showing an example of the arrangement of the printer 105. The printer 105 in FIG. 2 is, for example, an MFP (MultiFunctional Printer) and includes a printer apparatus and a scanner apparatus. In this embodiment, the printer 105 includes at least a printer apparatus. The printer 105 may include a facsimile apparatus serving as an apparatus for implementing another function. Alternatively, the printer 105 may be a printer having a single function.

The respective units of the printer 105 are connected to each other via a bus 205 arranged in an electric board (controller) 201. The electric board 201 comprehensively controls the printer 105. The printer 105 is controlled by a CPU 202 serving as the central processing unit. For example, the operation of the printer 105 in this embodiment can be implemented when programs stored in, for example, a ROM 204 are deployed in a RAM 203 and executed. The programs include an application for controlling printing and a control program for accessing an external server.

The printer 105 includes a network interface (I/F) 210 and a USB interface 209 to, for example, receive printing data from the outside and transmit scanned image data to the outside. The network interface 210 has, for example, an arrangement such as a wired LAN or wireless LAN corresponding to a network medium. The electric board 201 can be connected to the Internet 104 via the network interface 210. The electric board 201 is connected to a power supply board 211 and performs power supply to the printer 105 from the outside.

The electric board 201 and a printer unit 212 are connected via an engine interface 206. The printer unit 212 has an arrangement corresponding to a printing method such as an inkjet printing method or electrophotographic method and performs image printing on a printing medium such as a printing sheet. The electric board 201 and a scanner unit 213 are connected via a scanner interface 207. The electric board 201 and a UI (User Interface) unit 214 are connected via an operation unit interface 208. The UI unit 214 is arranged to include, for example, an LCD (Liquid Crystal Display). As an arrangement for accepting a user operation in the UI unit 214, a touch panel may be used or a button operation system independent of the LCD may be used. In addition, the UI unit 214 may include an LED for indicating the operation states of the printer apparatus and the scanner apparatus, an error state, or various setting states.

In this embodiment, the printer 105 will be described as the terminal of a user who uses the printing system shown in FIG. 1. However, as far as operations other than the operation for printing on the printing medium are concerned, the operation of the printer 105 in this embodiment may be applied to the client apparatus 106.

Screen display control shared between the teacher and the student using the printing system will be described with reference to FIGS. 3 to 7.

Figure 3:
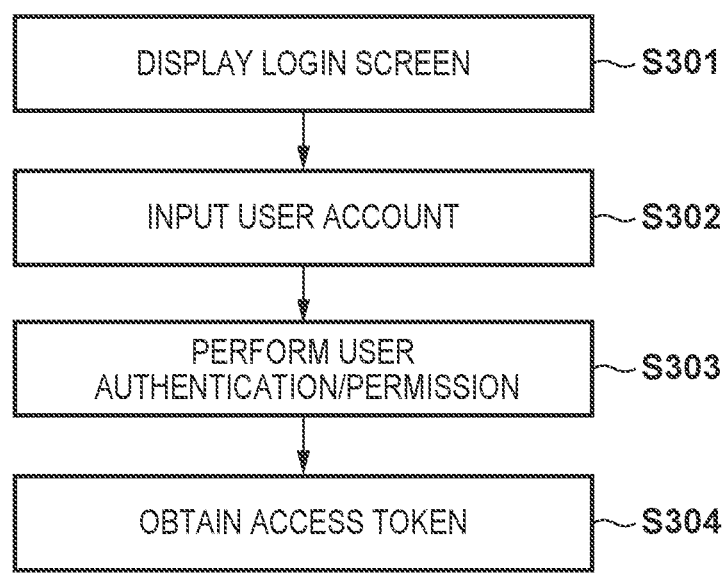
FIG. 3 is a flowchart showing user authentication processing between a plurality of services.

FIG. 3 is a flowchart showing user authentication/permission processing for allowing a cooperation operation in a plurality of services. The processing in FIG. 3 is an example of processing for first performing the user authentication/permission when the web services of the LMS service and the cloud management service are cooperated. The cloud management service includes various kinds of services such as a photo printing service and an SNS printing service, but will be referred to as the LMS printing service hereinafter. The processing in FIG. 3 is performed between the printer 105, the cloud management server 103, and the LMS server 101.

The cloud management server 103 preregisters use between the services for the LMS service. If the LMS printing service is registered for the LMS service, the LMS service can be cooperated with the LMS printing service.

Upon activating the LMS printing service by a user operation on the UI unit 214 of the printer 105, the printer 105 receives a login authentication screen of the LMS service via the Internet 104 and displays the screen on the UI unit 214 in step S301. In step S302, the printer 105 accepts the input of a user account on the login authentication screen.

In step S303, user authentication/permission of the LMS service is performed for the input account. To perform the user permission/authentication, a redirect is performed for the login authentication screen of the LMS service from the cloud management server 103 to the printer 105 or the client apparatus 106. In this case, for example, OAuth authentication is used. In the OAuth authentication, the cloud management server 103 operates as the role of a client, and the LMS server 101 operates as the role of a resource server. In step S303, user authentication confirms that the user who has logged in to the printer 105 or the client apparatus 106 has already been registered in the LMS service, and the user is not a spoofing user. In addition, in step S303, user pre-authentication is obtained to allow the LMS printing service to use the function of providing the LMS service within a range according to the authority of the login user.

The LMS printing service obtains, from the LMS service 101 and the storage server 102, permission for a function used in the LMS service and storage service to be used. For example, the user confirmation (user permission) for permission/rejection of each function is performed by screen display for the user in the UI unit 214 of the printer 105. At the time of user permission, the cloud management server 103 designates in advance the access authority range of a user who wants to use the LMS service. As the range of access authority, for example, class information, self-homework, the list of names of a class, a profile/icon, a shared file of the storage server 102, and the like are registered.

The LMS service manages an authenticated item for each user in the LMS printing service. If an item other than the access authority is executed in a state in which the user authentication is executed once, the permission screen for allowing this item is displayed on the UI unit 214 of the printer 105. In any case, the cloud management server 103 performs, to the printer 105 or the client apparatus 106, a redirect to the permission screen of the LMS service. The user selects permission or rejection in accordance with the displayed authentication screen. Note that if an LMS service authentication format not complying with the printer 105 appears, a QR code may be displayed on the UI unit 214 of the printer 105 to perform authentication on, for example the browser of a smartphone.

If user authentication is executed and only the user authentication is permitted, the process advances to the subsequent processing. If the user authentication is rejected, the processing in FIG. 3 ends, or the service is limited so as not to use the function of the rejected range. That is, the LMS printing service is operated within the permitted range. In addition, if all authentication for giving a request to the user via the UI unit 214 is not obtained, processing in FIG. 3 may end. Note that in step S303, user authentication/permission for using the storage service may be performed. In this embodiment, the LMS service collectively manages the user authentication/permission of the storage service. Note that the user authentication/permission for using the LMS service and the user authentication/permission for using the storage service may be individually performed.

If the user authentication/permission for using the LMS service is complete in step S303, the cloud management server 103 obtains an access token in step S304. By using the obtained access token, the cloud management server 103 can use the subsequent service cooperated between the LMS server 101 and the storage server 102.

Figure 4:
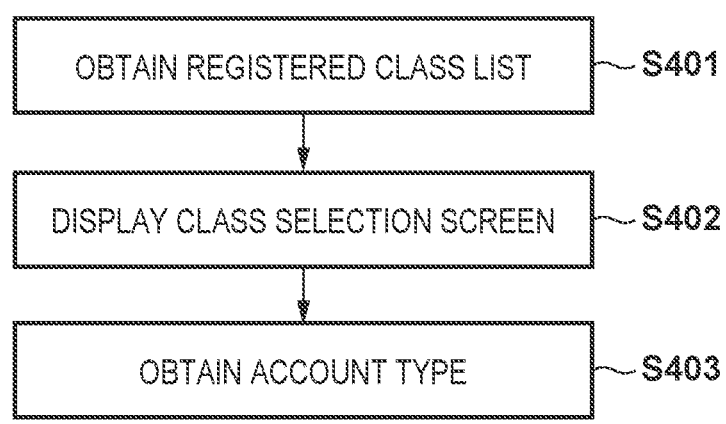
FIG. 4 is a flowchart showing account type determination processing.

FIG. 4 is a flowchart showing an example of processing for determining the user account type of the LMS service according to a class to which a user belongs in the printing system. For example, if the user is registered in a plurality of classes, a teacher/student account type may be switched depending on classes. For this reason, according to this embodiment, when executing printing at the printer 105, it is determined whether the user account type of the LMS printing service is the "teacher" or the "student".

First, in step S401, the cloud management server 103 obtains a registered class list from the LMS server 101. In this case, only a permitted class list is obtained based on the access authority set in the login user account. For example, if a student attends only three classes, that is, mathematics, national language, and science, information of these classes is obtained. Note that browsing of a shared file may not be permitted for security for a specific class (for example, an English class).

The registered class list includes information of constituent elements of each class. Information serving as the constituent elements of each class is, for example, a class name, a teacher name, a student name, a shared file, and pieces of attribute information thereof. The attribute information of the shared file includes status information such as a "prepared", "submitted", and "scored", URL information for obtaining the shared file, and a submission deadline.

After obtaining the registered class list, the cloud management server 103 displays a class selection screen on the UI unit 214 of the printer 105 in step S402. The selection of a class serving as a printing target is accepted on the class selection screen in accordance with the obtained registered class list.

In step S403, the cloud management server 103 determines based on the registered teacher list and the registered student list included in the registered class list whether the account type of the login user is the "teacher" or "student". In this case, depending on the LMS service, there are not the registered teacher list and the registered student list in the registered class list. In this case, by obtaining these lists from the LMS server 101, the type of the account of the login user may be determined. Alternatively, if the cloud management server 103 or the printer 105 holds information of the account type of the login user, this information can be used.

Figure 6:
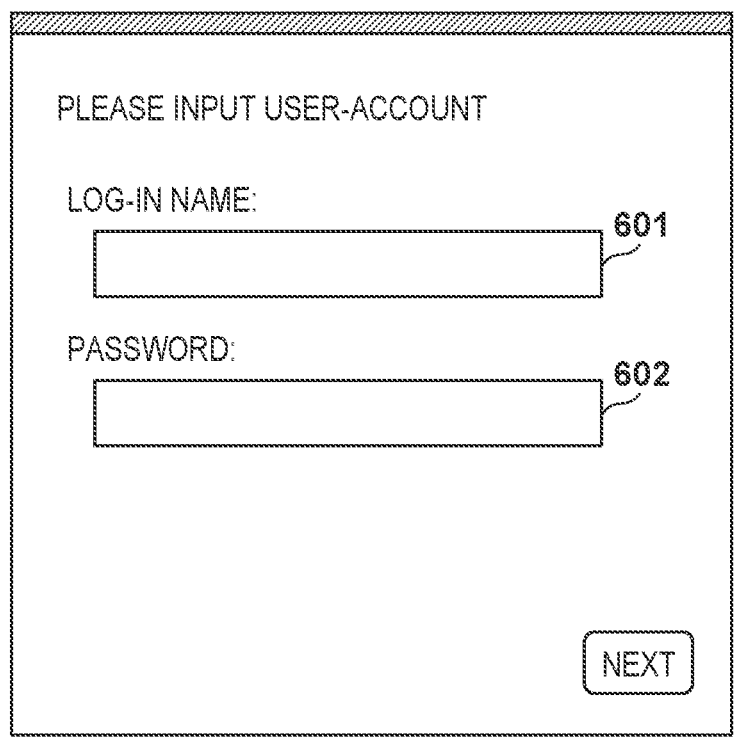
FIG. 6 is a view showing a user authentication screen.
Figure 7:
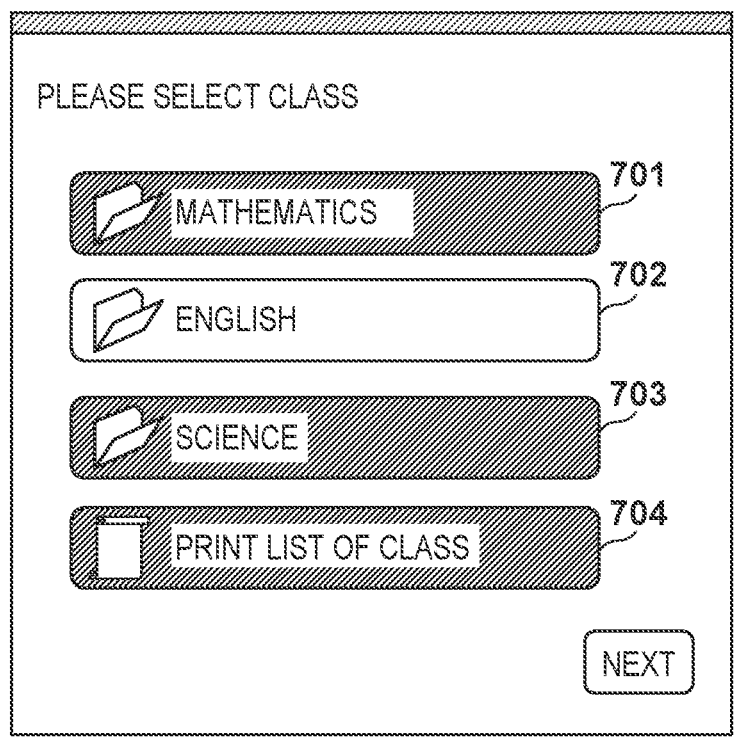
FIG. 7 is a view showing a class selection screen.
Figure 8:
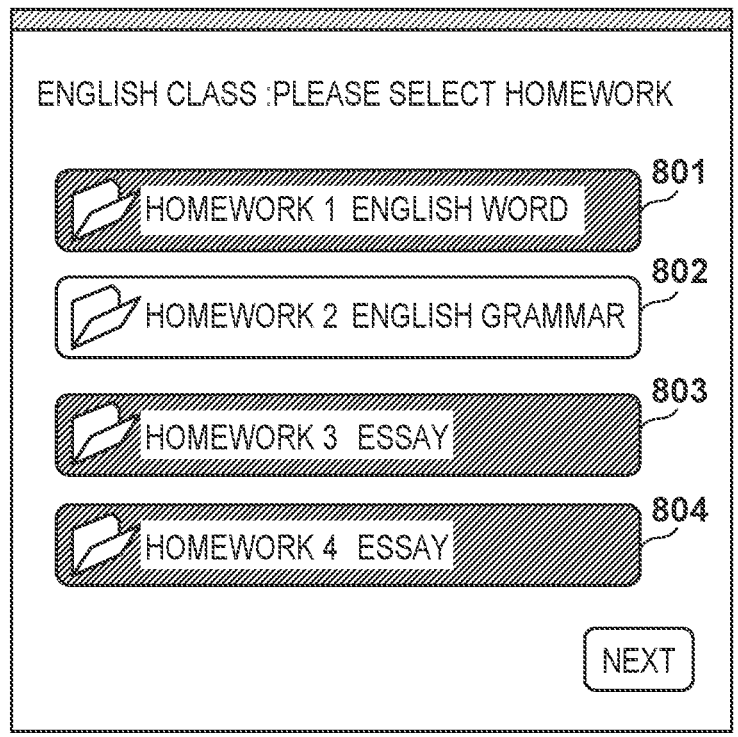
FIG. 8 is a view showing a homework selection screen of a teacher.
Figure 9:
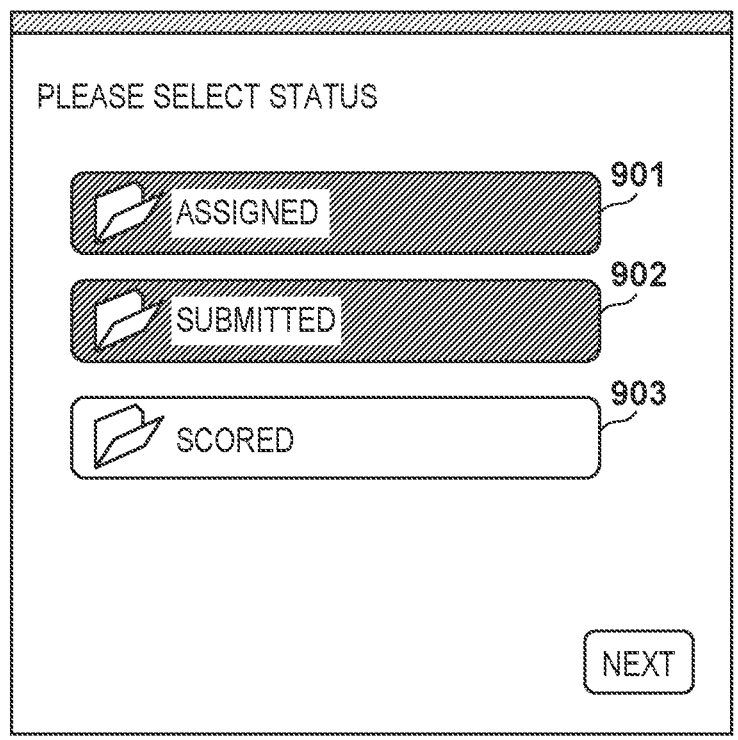
FIG. 9 is a view showing a homework state selection screen.
Figure 10:
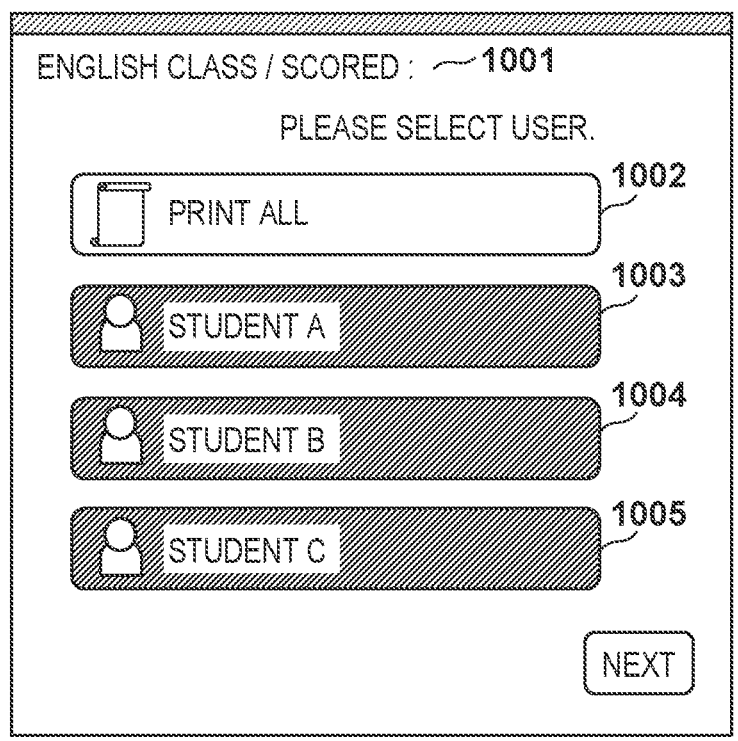
FIG. 10 is a view showing the user selection screen of a teacher.
Figure 11:
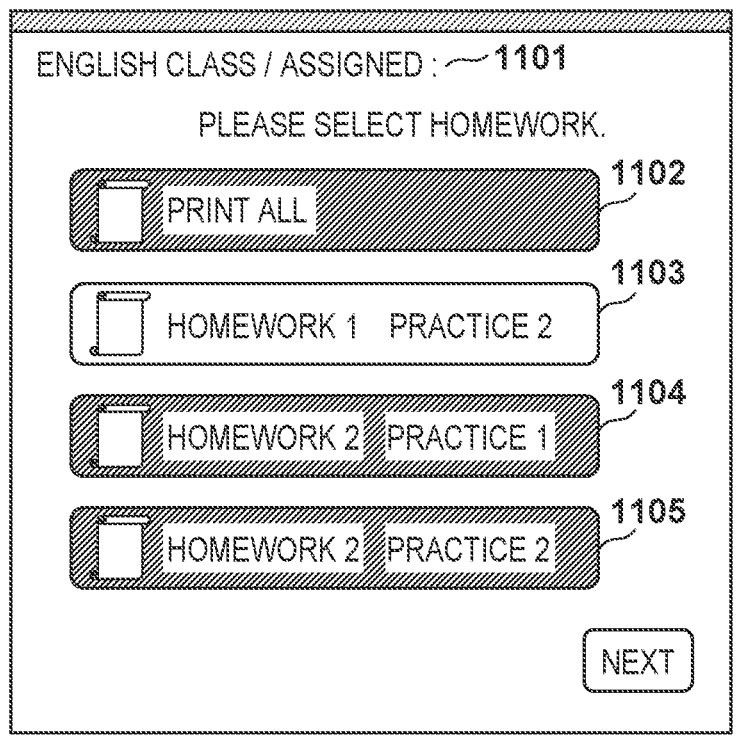
FIG. 11 is a view showing the homework selection screen of a student.
Figure 12:
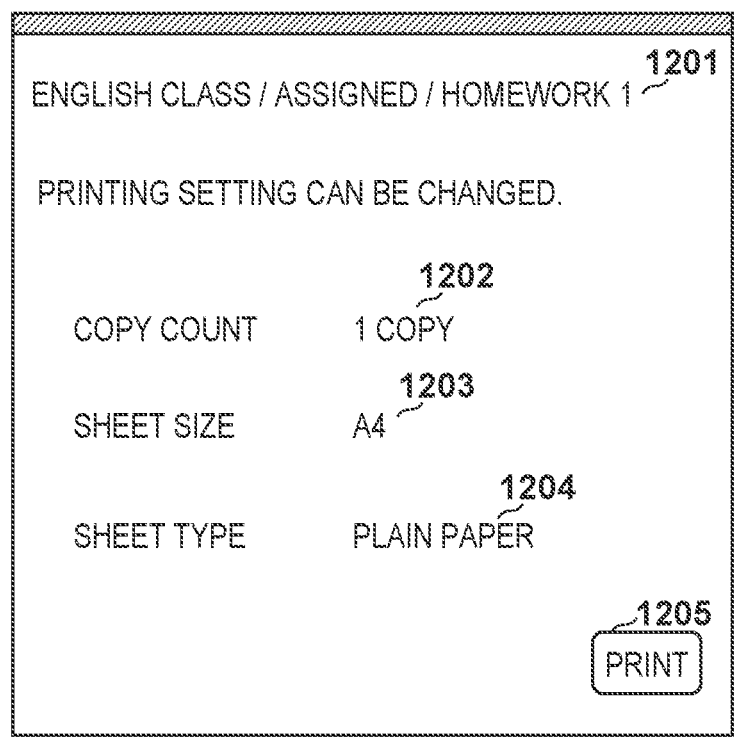
FIG. 12 is a view showing a printing setting screen.

FIGS. 5 to 11 are views showing examples of user operation screens displayed on the UI unit 214 of the printer 105 or the screen of the display unit of the client apparatus 106. FIGS. 5, 6, 7, and 9 are screens commonly displayed to the teacher and the student to narrow down and decide the printing target file. FIGS. 8 and 10 show screens displayed for the teacher, and FIG. 11 is a screen displayed for the student. FIG. 12 shows a printing setting screen. The web browser incorporated in the device of each of the printer 105 and the client apparatus 106 displays each screen described above based on a screen content transmitted from the cloud management server 103.

Figure 5:
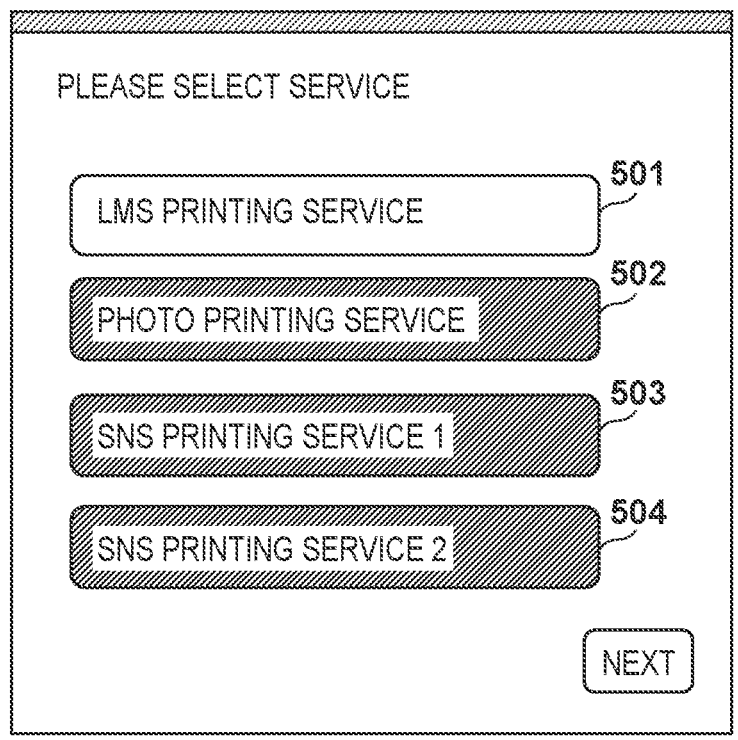
FIG. 5 is a view showing a service selection screen.

FIG. 5 is a view showing an example of a service selection screen of the LMS printing service. Items 501 to 504 are buttons for accepting activation instructions of the respective service. FIG. 5 shows a state in which the item 501 indicating the LMS printing service is selected. In each of FIGS. 5 to 12, the button display as the UI display for accepting a user operation such as selection is made, but UI display of another form may be made. If the item 501 for activating the LMS printing service is selected, the LMS printing service is executed. After the "next" button in FIG. 5 is pressed, a screen in FIG. 6 is displayed.

FIG. 6 is a view showing an example of a user authentication screen of the LMS service. If the login (user) name is input and the data are input to a password field 601 and a field 602 which are registered in the LMS service in advance, user authentication is performed, and login to the LMS service is performed. The processing concerning the display of the screen in FIG. 6, and the input of the login name and the password corresponds to steps S301 to S303 in FIG. 3. After the "next" button in FIG. 6 is pressed, a screen in FIG. 7 is displayed.

FIG. 7 is a view showing an example of a class selection screen of the LMS printing service. The display of the screen in FIG. 7 corresponds to step S402 in FIG. 4. In FIG. 7, the illustrated screen displays an example in which an item 701 indicating a mathematics class, an item 702 indicating an English class, and an item 703 indicating a science class are displayed based on the account and the registered class list of the login user. The user can select a class associated with the printing target file on the screen in FIG. 7. FIG. 7 shows a state in which the item 702 indicating the English class is selected.

The registered class list in step S401 of FIG. 4 may be obtained every time immediately before the display of the screen in FIG. 7. Alternatively, if the same list has already been obtained in the past, the list may be stored in the cloud management server 103, and the screen in FIG. 7 may be displayed using this list. An item 704 in FIG. 7 is a button for accepting the printing instruction of the list of all the classes to which the user belongs. After the "next" button in FIG. 7 is pressed, the account type in step S403 of FIG. 4 is determined.

FIG. 8 is a view showing an example of a homework selection screen displayed when the account type of the login user is the "teacher". FIG. 8 shows an example in which the teacher himself/herself has already prepared items 801 to 804 indicating homework in an English class in charge of the teacher.

FIG. 8 shows that the item 801 indicating homework 2 has been selected. The icon of the selected item 801 is displayed in the form of a folder. This is because narrowing-down of students is not performed yet until the display time of the screen in FIG. 8 since a plurality of students belonging to this class are registered, and printing target files for the plurality of students are present as narrowing-down targets. After the "next" button in FIG. 8 is pressed, a screen in FIG. 9 is displayed.

FIG. 9 is a view showing an example of a state selection screen for narrowing down printing target files in accordance with the attribute information of the shared file. Status information such as "assigned", "submitted", and "scored", URL information for obtaining a shared file, and a submission deadline are set in the attribute information of the shared file. FIG. 9 shows that an item 901 indicating the attribute information "assigned", an item 902 indicating the attribute information "submitted", and an item 903 indicating the attribute information "scored" are displayed. FIG. 9 shows a state in which the item 903 has been selected. FIG. 9 shows an example of status information as an example, but may show another attribute information as the selection item.

As described above, in this embodiment, screen display control is performed such that the user selects a class on the screen of FIG. 7 at the beginning of the screen operation procedure. Note that if the account type of the login user is the "student", a "skip" button may be arranged on the class selection screen in FIG. 7 after the registered class list is obtained in step S401 in FIG. 4 assuming that the student attends a plurality of classes. For example, this has an effect in a case in which, for example, the student attends to the plurality of classes. In this case, on the screen in FIG. 9, narrowing-down of the printing target file may be executed from all the classes that the student attends. After the "next" button in FIG. 9 is pressed, a screen in FIG. 10 or 11 is displayed in accordance with the account type.

FIG. 10 is a view showing an example of a user selection screen displayed when the account type of the login user is the "teacher". As shown in FIG. 10, that the "English class/scored" has been selected is displayed in text display 1001 based on the narrowing-down of the printing target file with the attribute information "scored" in accordance with the preceding user's screen operation procedure. In addition, as choices, an item 1002 for accepting an instruction for performing collective printing for all the students, and items 1003, 1004, and 1005 for accepting instructions for collectively printing the shared file for an individual student are displayed on the screen in FIG. 10. As described above, according to this embodiment, the user as the teacher can select collective printing for all the students or collective printing of the shared file for each individual student.

In addition, the number of files serving as targets may be displayed together with each collective printing button. With this arrangement, for example, when the number of students registered in a corresponding class is large, and the buttons of the individual students cannot be entirely displayed within one screen, the user can easily recognize the number of files serving as the collective printing targets. In addition, the user can easily recognize the number of files corresponding to each collective printing button. Alternatively, a file type which cannot be printed at the printer 105 may be obtained in advance, whether printing is possible may be determined based on the extension of the printing target file, and the number excluded from the file count serving as the collecting printing targets may be displayed. After the "next" button in FIG. 10 is pressed, a screen in FIG. 12 is displayed.

FIG. 11 is a view showing an example of a homework file selection screen displayed when the account type of the login user is the "student". As shown in FIG. 11, that the "English class/assigned" has been selected is displayed in text display 1101 based on narrowing-down of the printing target file with the attribute information "assigned" in accordance with the user's screen operation procedure. In addition, as choices, an item 1102 for accepting an instruction for collectively printing all pieces of homework, and items 1103, 1104, and 1105 for accepting an instruction for printing the shared file for each individual homework are displayed on the screen in FIG. 11. As described above, according to this embodiment, the user as the student can select collective printing of all pieces of homework or collective printing of the shared file for each individual homework. In addition, the number of files serving as targets may be displayed together with each collecting printing button. With this arrangement, even if the number of pieces of homework is large, and the display of the buttons for the individual pieces of homework cannot be displayed within one screen, the user can easily recognize the number of files serving as the collecting printing targets. In addition, the user can easily recognize the number of files corresponding to each collective printing button. Alternatively, a file type which cannot be printed at the printer 105 may be obtained in advance, whether printing is possible may be determined based on the extension of the printing target file, and the number excluded from the file count serving as the collecting printing targets may be displayed. After the "next" button in FIG. 11 is pressed, a screen in FIG. 12 is displayed.

FIG. 12 is a view showing an example of a printing setting screen. FIG. 12 shows an example of the printing setting screen displayed when the account type of the login user is the "student" and narrowing-down of the printing target file is executed with "English class/assigned/homework 1" in accordance with the user's screen pre-operation procedure. Text display 1201 displays that the printing target file is narrowed down in the "English class/assigned/homework 1".

The screen in FIG. 12 displays a copy count 1201, a sheet size 1203, and a sheet type 1204, and the user can change settings of these values. When a printing button 1205 is pressed, printing setting parameters and printing data on which the setting contents on the screen are reflected are transmitted from the cloud management server 103 to the printer 105. Items whose settings can be changed are not limited to the above items, but may be other items.

According to this embodiment, since shared files included in a condition narrowed down by the user are collectively printed, a plurality of types of the file formats of the shared files may be included. For example, files include a file in a slide form or a file in a document form. For this reason, the number of file formats may be obtained in advance, the number of file formats may be automatically counted without being through the user operation, and a plurality of printing settings may be set. For example, the printing setting screen in FIG. 12 may be displayed a number of times equal to the number of file formats and may be set. In this case, the user can recognize the format types by displaying an extension or format name on the printing setting screen.

The cloud management server 103 may determine, based on an extension, a shared file included in a format which cannot be executed by printing data processing and skip the determined shared file from the printing data processing. In this case, after the completion of printing of all printable files, error display of a file which is unprinted due to non-support may be made on the UI unit 214 of the printer 105.

If a format which cannot undergo printing data processing is included, the cloud management server 103 sends a request to another server capable of executing the printing data processing to perform printing data processing. For example, the cloud management server 103 transmits a format conversion request to another server capable of executing the printing data processing and transmits, to the printer 105, the shared file whose format is converted by a file format (for example, JPEG or PDF format) interpretable by the printer 105.

Figure 13:
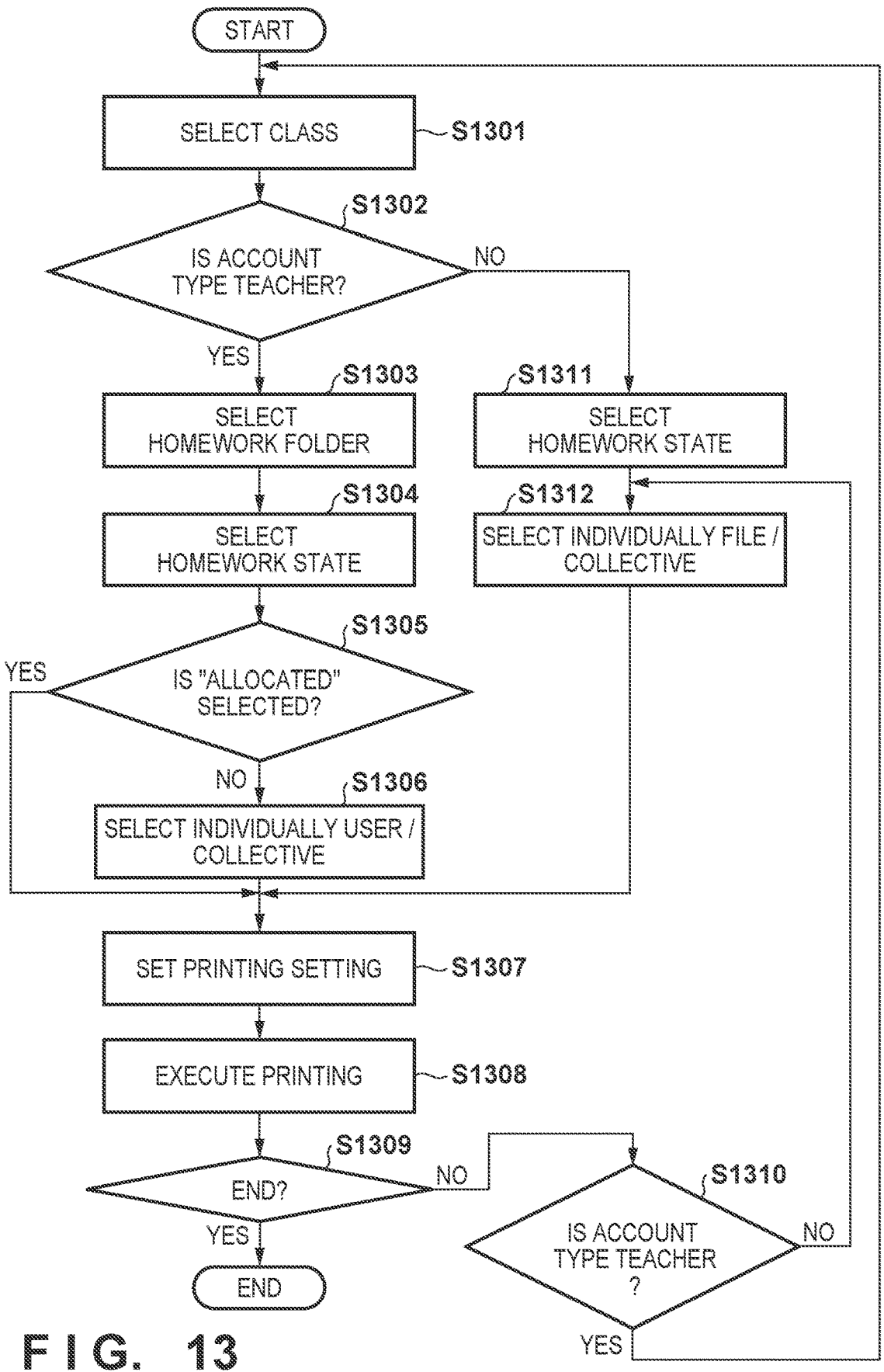
FIG. 13 is a flowchart showing processing until execution of printing.

FIG. 13 is a flowchart showing processing until printing execution in the printing system according to this embodiment. The processing in FIG. 13 is implemented, for example, when the CPU 202 reads out the program stored in the ROM 204 into the RAM 203 and executes the program. According to this embodiment, the user performs selection for narrowing down the printing target file (FIGS. 7 to 11), performs printing settings (FIG. 12), and executes printing in accordance with the operation on the operation screen of the printer 105 or the client apparatus 106. When processing in FIG. 13 is started, processing associated with the screens in FIGS. 5 and 6 has been completed.

In step S1301, the CPU 202 displays the class selection screen in FIG. 7 on the UI unit 214 and accepts selection of a class serving as a printing target. In step S1302, based on the processing in FIG. 4, the CPU 202 determines whether the account type of the login user in the selected class is the "teacher" or "student". If it is determined in step S1302 that the account type of the login user is the "teacher", the process advances to step S1303.

In step S1303, the CPU 202 displays the homework selection screen in FIG. 8 on the UI unit 214 and accepts selection of the homework folder for the selected class. At the time of display of the screen in FIG. 8, since a plurality of students are assigned to one homework prepared by the teacher, the folder icon for each item is displayed.

In step S1304, the CPU 202 displays the homework state selection screen in FIG. 9 on the UI unit 214 and accepts the homework state selection in addition to the selected class and the selected homework folder.

The CPU 202 determines in step S1305 whether the attribute information "assigned" is selected on the screen in FIG. 9. In this case, if it is determined that the attribute information "assigned" is selected, the process skips step S1306 and advances to step S1307. This is because homework having the account type of the login user as the "teacher" and the "assigned" state is homework itself prepared by the user himself/herself as the teacher, and selection of the individual/collective user selection in step S1306 to be described later is unnecessary. On the other hand, if it is determined that the attribute information "assigned" is not selected, in step S1306, the CPU 202 displays the user selection screen in FIG. 10 on the UI unit 214 and accepts selection to determine whether the homework of each individual student is printed or the pieces of homework of all the students are collectively printed in addition to the selected class and the selected state (for example, a "scored" state).

If it is determined in step S1302 that the account type of the login user is the "student", the process advances to step S1311.

In step S1311, the CPU 202 displays the homework state selection screen in FIG. 9 on the UI unit 214 and accepts the homework state selection in addition to the selected class. If the account type of the login user is the "student", processing in step S1303 is unnecessary and is not performed.

In step S1312, the CPU 202 displays the user selection screen in FIG. 11 on the UI unit 214 and accepts selection of the collective printing of the shared file of one homework from the pieces of homework as individual candidates or the collective printing of all pieces of homework in addition to the homework selected state (for example, an "assigned" state). Note that the collective printing settings by the student are set invalid in the initial settings, and the collective printing settings may be changed to be valid by a setting change. Also, there may be no collective printing setting by the student.

As described above, if the account type is the "teacher", homework selection is performed on the screen in FIG. 8 in step S1303. After that, in step S1304, the homework state is selected on the screen in FIG. 9. On the other hand, if the account type is the "student", the homework state is selected on the screen in FIG. 9 in step S1311. After that, in step S1312, the homework is selected on the screen in FIG. 11. That is, in the "teacher" and the "student", the display order of the screen for selecting the homework state and the screen for selecting the homework file is reversed. In general, the relationship between the teacher and the students in a class is a one-to-many relationship, and the teacher prepares homework. Based on this tendency, according to this embodiment, the user operation order for the "teacher" is changed from that for the "student", thereby further facilitating narrowing-down of the printing target file.

After steps S1306 and S1312, in step S1307, the CPU 202 displays the printing setting screen in FIG. 12 on the UI unit 214 and accepts the printing setting change or the printing instruction. The printing settings designated here are applied to all the printing target files. For example, if the copy count is two, two copies each including printing target files are printed. For example, if a document file and a presentation file are included in the printing target file as a result of narrowing down the printing target files by the user's screen operations in FIGS. 7 to 11, the file of each format is printed for two copies.

When a printing button 1205 is pressed on the printing setting screen in FIG. 12, the CPU 202 executes printing in step S1308.

In step S1309, the CPU 202 displays, on the UI unit 214, a user interface screen for determining whether to end or continue the LMS printing service after the completion of printing, and determines based on the selection result whether to end or continue the LMS printing service. If it is determined to end the LMS printing service, processing in FIG. 13 ends. On the other hand, if it is determined to continue the LMS printing service, the process advances to step S1310.

In step S1310, the CPU 202 determines, using the account type information obtained in step S1302, whether the login user in the selected class is the teacher or the student. If it is determined that the login user is the teacher, processing from step S1301 is repeated. On the other hand, if it is determined that the login user is the student, processing from step S1312 is repeated. Note that if a student belongs to a plurality of classes, the processing in FIG. 13 ends once, and processing in FIG. 13 for another class is performed.

Processing other than the procedure shown in FIG. 13 may be performed. For example, if it is determined that the login user is the teacher, the processing from step S1303 may be repeated. However, if it is determined that the login user is the student, the processing from step S1301 may be repeated. Note that in this case, if a teacher belongs to a plurality of classes, the processing in FIG. 13 ends once, and processing in FIG. 13 is performed for another class. If the login user is the "teacher" in a class having the same login user, and the login user is the "student" in another class, processing from the class selection in step S1301 may be repeated. In addition, the return destination of the processing performed when printing is continued in steps S1309 and S1310 obtains the registered class count of the login user from the registered class list information and changes the class count in accordance with the registered class count. For example, if the class count is registered as a plurality of classes, the processing from step S1301 may be repeated.

FIG. 14 is a sequence chart of the communication sequence between a plurality of servers in the printing system in FIG. 1. In S1401, the printer 105 transmits the service information obtaining request for the cloud management server 103. In step S1402, the cloud management server 103 transmits the service information to the printer 105. In S1402, for example, service information indicated by the items 501 to 504 in FIG. 5 is transmitted. In S1403, after accepting the selection of the LMS printing service, the printer 105 transmits its selection information to the cloud management server 103. This corresponds to, for example, a case in which the LMS printing service of the item 501 on the screen of FIG. 5 is selected.

In S1404, the cloud management server 103 notifies an access request for the LMS service authentication URL by a redirect to the printer 105. In S1405, the printer 105 executes the LMS service authentication request to the LMS server 101. In S1406, the printer 105 receives the authentication screen transmitted from the LMS server 101 and displays it on the UI unit 214. This corresponds to, for example, the display of the screen in FIG. 6. In S1407, the printer 105 transmits the authentication information such as the user name and the password to the LMS server 101. In S1408, the LMS server 101 transmits OAuth authentication completion notification to the cloud management server 103.

In S1409, the cloud management server 103 transmits the class information obtaining request to the LMS server 101. In S1410, the LMS server 101 transmits the shared file information obtaining request to the associated storage server 102 and obtains the shared file information from the storage server 102. In S1411, the LMS server 101 transmits the class information and the shared file information to the cloud management server 103. In this case, the registered class list, the shared file URL, and the like are included in the class information.

In S1412, the printer 105 transmits the screen display request to the cloud management server 103. In S1413, the cloud management server 103 transmits the operation screen data of the LMS printing service. Since the processing in S1412 and S1413 executes the screen operation required for narrowing down the printing target files, the processing is performed a necessary number of times in accordance with the teacher and student selection results. For example, the processing is performed by the number of times for obtaining the screens in FIGS. 7 to 11. Note that the screen display request in S1412 includes, for example, information indicating that the "next" button of each screen is pressed.

In S1414, when the user presses the printing button 1205 in FIG. 12, the printer 105 transmits the printing execution request to the cloud management server 103. In S1415, the cloud management server 103 designates as a destination the URL included in the shared file information obtained in S1411, transmits the shared file obtaining request to the storage server 102, and obtains the shared file (the printing target file). In S1416, the cloud management server 103 transmits the obtained shared file to the printer 105. The printer 105 prints the received shared file in accordance with the printing settings designated on the screen in FIG. 12. In this case, if there are a plurality of shared files narrowed down by the screen operation of the user, processing in S1415 and S1416 is repeatedly executed.

If a format which cannot undergo printing is included in the shared file, the cloud management server 103 determines the file based on an extension and skips processing of the determined file in the repeated processing in S1415 and S1416. Note that this determination processing may be performed by the printer 105. After all printable files are completely printed, error display of the file unprintable due to the non-support may be displayed on the UI unit 214 of the printer 105 in S1416.

The processing of the printer 105 in FIG. 14 according to this embodiment may be performed by the client apparatus 106. In this case, the same explanation is made for the printer 105 except that the reception destination in the printing data reception in S1416 is the printer 105.

As described above, according to this embodiment, in the system in which printing is performed via the cloud system, a shared file is easily narrowed down among the shared files across the plurality of users and the plurality of classes, and collective printing can be performed. For example, on the screen in FIG. 10, a teacher can collectively print the submitted files of the students of the class in charge of the teacher. In addition, for example, on the screen in FIG. 11, each student can collectively print the submitted files of the classes that the student attends.

The effects of this embodiment will be described below. When performing printing from the LMS, a plurality of printing target files present on the network storage must be individually printed. In general, in the LMS, applications are executed from the web browser in many cases. For this reason, the default printing system incorporated in the web browser must be called and used, or a PDF (Portable Document Format) viewer application must be called to perform printing upon storage of the application in the PDF. More specifically, when executing printing in the LMS web application, the web application converts the printing target file serving as the application document into a single file of the PDF format serving as a general format. The converted file is transferred to a printing driver set as a default setting in the operating system.

Depending on a web application, a file format of a text or a CSV other than the PDF can be selected and output as a file. However, since another viewer application corresponding to the file format must be activated, the printing target file must be opened, and printing must be performed, operations required until printing are further complicated. In particular, when the plurality of printing target files are collectively printed, the printing operation must be repeated for each file, resulting in the cumbersome operations.

That is, in a case in which a teacher uses a printing service, the submission files of a plurality of students of a class in charge of the teacher cannot be collectively printed, resulting in inconvenience. On the other hand, according to this embodiment, the submitted files of the plurality of students can be collectively and easily printed.

In addition, in a case in which a student uses a printing service, the homework files of a plurality of classes that the student attends cannot be collectively printed, resulting in inconvenience. On the other hand, according to this embodiment, the homework files of the class that the student attends can be collectively and easily printed. In addition, the homework files of the plurality of classes that the student attends can be collectively and easily printed.

In addition, in a case in which the LMS is used in a training institution in a company, for example, assume that the user is an instructor (a teacher) in a given class, and identical users attend as students in another class. If the teacher and the student are identical persons, printing cannot be performed with a simple operation in accordance with the account type of the login user, resulting in inconvenience. On the other hand, according to this embodiment, even if the teacher and the student are identical persons, the type of the login user account is determined for each class, and printing can be performed by an easy operation procedure corresponding to the user account type.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-092545, filed May 27, 2020, which is hereby incorporated by reference herein in its entirety.

What is claimed is:

1. A system for obtaining a file on a network and printing the file, comprising:
a controller that executes a program to function as:
a determination unit configured to determine whether an account of a user is an account of a first type or an account of a second type;
a display control unit configured to change screens to be displayed for deciding a printing target file by accepting an operation of the user, between a case in which the account of the user is determined to be the account of the first type and a case in which the account of the user is determined to be the account of the second type,
wherein the display control unit changes, in accordance with the determination by the determination unit, a number of the screens to be displayed for the user to specify the printing target file from when displaying a screen for a user to login to when displaying a screen for the user to specify the printing target file, the number of screens to be displayed for the account of the first type being different from the number of screens to be displayed for the account of the second type; and
a printing unit configured to obtain the printing target file decided by the user and print the printing target file.

2. The system according to claim 1, wherein the account of the first type is a teacher account, and the account of the second type is a student account.

3. The system according to claim 1, wherein the determination unit determines whether the account of the user is the account of the first type or the account of the second type, for each class.

4. The system according to claim 1, further comprising:
a second determination unit configured to determine whether the account of the user is the account of the first type or the account of the second type after printing by the printing unit ends,
wherein another printing target file from the plurality of files on the network is decided based on a determination result of the second determination unit.

5. The system according to claim 1, wherein if the printing target file includes a plurality of printing target files, the printing unit obtains and prints a plurality of printing target files from the network after the plurality of printing target files are decided.

6. The system according to claim 1, wherein the printing unit obtains and prints the printing target file from a network storage on the network, and
files created and edited by users of a plurality of types of accounts are stored in the network storage.

7. The system according to claim 1, wherein the printing unit performs printing for a file determined to be printable and does not perform printing for a file determined not to be printable.

8. The system according to claim 7, further comprising:
a conversion unit configured to convert a file format of the file determined not to be printable into a file format which allows printing,
wherein the printing unit obtains and prints a file whose file format is converted by the conversion unit.

9. The system according to claim 7, further comprising:
a second display control unit configured to display a screen capable of changing a printing setting for the printing unit, wherein if the plurality of printing target files are files of a plurality of file formats, the second display control unit displays changeable screens for the plurality of file formats.

10. The system according to claim 1, wherein the display control unit further changes at least one of a display order, or types of a plurality of screens for deciding the printing target file, from when displaying the screen for the user to login to when displaying the screen for the user to specify the printing target file, between a case in which the account of the user is determined to be the account of the first type and a case in which the account of the user is determined to be the account of the second type.

11. A control method executed by a processor in a system for obtaining and printing a file on a network, the method comprising:
   determining whether an account of a user is an account of a first type or an account of a second type;
   a display control step of controlling to change screens to be displayed for deciding a printing target file by accepting an operation of the user, between a case in which the account of the user is determined to be the account of the first type and a case in which the account of the user is determined to be the account of the second type,
   wherein the display control step changes, in accordance with the determination by the determining step, a number of the screens to be displayed for the user to specify the printing target file from when displaying a screen for a user to login to when displaying a screen for the user to specify the printing target file, the number of screens to be displayed for the account of the first type being different from the number of screens to be displayed for the account of the second type; and
   obtaining the decided printing target file decided by the user and printing the printing target file.

12. A non-transitory computer-readable storage medium storing computer-executable code of a program for a control method executed by a processor in a system for obtaining and printing a file on a network, the computer-executable code comprising code to execute:
   determining whether an account of a user is an account of a first type or an account of a second type;
   a display control step of controlling to change screens to be displayed for deciding a printing target file by accepting an operation of the user, between a case in which the account of the user is determined to be the account of the first type and a case in which the account of the user is determined to be the account of the second type,
   wherein the display control step changes, in accordance with the determination by the determining step, a number of the screens to be displayed for the user to specify the printing target file from when displaying a screen for a user to login to when displaying a screen for the user to specify the printing target file, the number of screens to be displayed for the account of the first type being different from the number of screens to be displayed for the account of the second type; and
   obtaining the decided printing target file decided by the user and printing the printing target file.

13. The non-transitory computer-readable storage medium according to claim 12, wherein the account of the first type is a teacher account, and the account of the second type is a student account.

14. The non-transitory computer-readable storage medium according to claim 12, wherein the determining determines whether the account of the user is the account of the first type or the account of the second type, for each class.

15. The non-transitory computer-readable storage medium according to claim 12, further comprising:
   a second determining step of determining whether the account of the user is the account of the first type or the account of the second type after printing by the printing unit ends,
   wherein another printing target file from the plurality of files on the network is decided based on a determination result of the second determination unit.

16. The non-transitory computer-readable storage medium according to claim 12, wherein if the printing target file includes a plurality of printing target files, a plurality of printing target files are obtained and printed from the network after the plurality of printing target files are decided.

17. The non-transitory computer-readable storage medium to claim 12, wherein the printing unit obtains and prints the printing target file from a network storage on the network, and
   files created and edited by users of a plurality of types of accounts are stored in the network storage.

18. The non-transitory computer-readable storage medium according to claim 12, wherein the printing unit performs printing for a file determined to be printable and does not perform printing for a file determined not to be printable.

19. The non-transitory computer-readable storage medium according to claim 12, wherein the display control unit further changes at least one of a display order, or types of a plurality of screens for deciding the printing target file, from when displaying the screen for the user to login to when displaying the screen for the user to specify the printing target file, between a case in which the account of the user is determined to be the account of the first type and a case in which the account of the user is determined to be the account of the second type.

* * * * *